United States Patent [19]

Yano

[11] 4,432,732
[45] Feb. 21, 1984

[54] METHOD FOR PREDICTING PROPERTIES OF A CHEMICAL COMPOUND

[76] Inventor: Kunihiko Yano, c/o Yano-Miyazaki Research Laboratory, 4781-3 L-19-6, Ooba, Fujisawa-Shi, Kanagawa-Ken, Japan

[21] Appl. No.: 401,847

[22] Filed: Jul. 26, 1982

[51] Int. Cl.³ .............................................. G09B 23/24
[52] U.S. Cl. ..................................... 434/298; 283/1 A
[58] Field of Search ................. 283/1 A; 434/298, 218

[56] References Cited

U.S. PATENT DOCUMENTS

| | | | |
|---|---|---|---|
| 1,402,803 | 1/1922 | Smith | 283/1 A |
| 3,487,559 | 1/1970 | Freedman | 434/218 |
| 3,736,411 | 5/1973 | Berndt | 434/218 X |
| 3,769,728 | 11/1973 | Lu | 434/298 X |

Primary Examiner—Harland S. Skogquist
Attorney, Agent, or Firm—Elliot M. Olstein; Louis E. Marn

[57] ABSTRACT

This invention relates to method for predicting properties of a chemical compound, wherein, on the basis of all available information about the chemical structure and observed activities, an optimal range of the chemical structure of a desired property is described with a control chart or the Mahalanobis' generalized distance, thereby the properties of the chemical compound is able to be predicted by analyzing only the chemical structure.

4 Claims, 4 Drawing Figures

Toxicity-structure chart

Taste-structure chart

METHOD FOR PREDICTING PROPERTIES OF A CHEMICAL COMPOUND

BACKGROUND OF THE INVENTION

This invention relates to method for predicting properties of a chemical compound from its structure, by which it is possible to design a new chemical structure having a desired property.

Today, the industrial need to find an effective molecular design technique is growing rapidly. The probability of success in the conventional screening process to discover a useful compound is extremely low. Even the task of selecting the best compound in a given homologous group requires an astronomical number of trials. α-Naphthoic acid, for example, has seven replaceable positions as shown below.

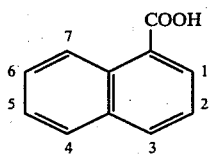

The number of possible compounds by replacing these positions with 20 commonly used substituents amounts to $20^7$ ($=1.28\times 10^9$). Considering the fact that the number of compounds registered each year to the chemical abstracts is in the order of $10^5$, the time and money for this task is at the impossible level. In reality, experiences, intuition, ease of synthesis and various kinds of mechanistic knowledge allow some selections rather than random approach, but the predictability of the activity from the chemical structure is generally very poor.

Any practical property of compounds, sometimes more aptly called activity, is multivariate in nature. This recognition led many people to apply multivariate analysis techniques for the problems of the structure-activity analysis, but at present no universal technique is known.

To classify the prior art of this field, it is customary to follow Cramer's example (R. D. Cramer, et al., Chemical Society Reviews 3, 273 (1974)): (1) lead-generation techniques and (2) lead-optimization techniques. The former group of techniques attempt to predict a new lead compound from known results. At present, there is no industrially dependable prior art in this field. The latter prior art aims only at predicting the best compound in the homologs after a lead was discovered. Although some successful cases have been reported, they naturally lack the universal applicability. (Y. C. Young, Journal of Medicinal Chemistry, 24, 230 (1981)).

The common feature of the prior arts is that they are method-oriented rather than problem-oriented. The models developed elsewhere to explain certain phenomena have been rather mechanically applied to more complex systems. The following comment by one of the experts in this field describes the state of this art (R. Cramer, Chemical Technology, 744 (1980)); "Let's not emulate the drunk who searched for his key under lamppost, where he could see, rather than the dark corner, where he lost it!"

This invention contains two new elements: (1) Use of control chart to define the target, and (2) Use of the principle of equilibrium as a powerful means to find the cause-effect relationship. Unlike many other prior arts, this process is not designed to "explain" the given phenomena, but it relies on a well-established engineering art of problem-solving—construction and use of control chart. (W. A. Shewhart, "Economic Control of Quality of Manufacturing Products", Chap. XX, P. 301, D. van Nostrand Co., Inc., New York 1931). Such an engineering art is based on the assumption that a desirable outcome is the consequence of selecting optimum causes. It tacitly implies that an engineer has to search for causes when the cause-effect relations are not readily apparent. In applying the control chart technique to the molecular design, it will not be complete unless a technique of the cause-finding is established. Now, in the following section I will described this part of art in detail. A practical property or activity of a compound is measured with a particular scale suitable to the object. Such a practical measure, such as $LD_{50}$ and $ED_{50}$, is usually broken down to several elementary properties in an attempt to define the cause-effect relationships. These elementary properties, such as acidity, lipophilicity, electronegativity and so on, are less complex, are well-defined and has a universal meaning.

Because these elementary properties themselves are not generally predictable from the chemical structures, such an approach has an intrinsic limitation as a universal technique of molecular design. To eliminate this limitation, some people have been attempting to correlate a practical property directly to structural parameters (B. R. Kowalski & C. F. Bender, Journal of the American Chemical Society, 94, 5632 (1972); A. J. Stuper and P. C. Jurs, ibid., 97, 182 (1974)). Although such an approach has an advantage in offering the direct structure-activity relationships, the choice of structural parameters are rather arbitrary and, because of this, this approach has not met with a significant success. For such an approach to be successful, the arbitrariness of the choice of parameters must be minimized by the introduction of some new principles. I have done this by "the principle of balance".

Any practically useful compound should have a certain balance of elementary properties. Because the practical working environments of a compound are generally complex, the compound of high activity is expected to satisfy more than one requirements. According to this principle, the activity will decrease if the desirable balance of elementary properties is displaced. This principle has been proven in practical world in a variety of ways. The art of control chart, as mentioned earlier, seeks the optimum ranges of causes to get a desired effect, and it worked well. In a biological field, the invariance of partition coefficients of highly active compounds, in spite of the variety of structures, has been well recognized. (C. Hansch, Chemical Technology, 120 (1977)).

Because an elementary property of a compound is, in turn, related to a certain structural features, a highly active compound should, then, possess a certain equilibrium of structural features. The control chart technique is best to express such a structural equilibrium with a certain allowance. Although the concept of control chart is a product of engineering wisdom, the idea can be safely applied to the biological problem. Homeostasis, a principle of equilibrium, should control the requirements of biologically active compounds. As long as the cause-effect relationships are expressed by the control chart, this process has no limitation in its applicability.

A thorough examination of structural parameters and the correlation coefficients among them is the essential preparatory step to construct a reliable control chart. Once the chart is constructed, the structures to be designed should fall within the control limit of the chart, just as the reaction temperatures and pressures should be kept within the optimal ranges to obtain a desired product.

The control limit can be shown either on paper or in terms of the Mahalanobis' generalized distance from the center of the desirable zone. The former method is advantageous when a particular compound outside of the limit is to be modified to obtain a higher activity, because the deviation from the target area is visibly grasped, but it has a natural limitation of dimension. The Mahalanobis' generalized distance is a convenient scale in sorting out hopeful candidates even in the case of multivariate control chart.

In practice, this process involves the following steps:

(1) A set of compounds of known structures and activities are grouped by the activity levels. Each compound is, then, converted to a series of numerals in a predetermined format. Each of the numerals describes an aspect of the structure called structural parameters. These values are fed into a computer for the processing described below. This coding process is not particularly new, except the choice of the parameters.

(2) Using the data set prepared above, the correlation coefficients of all combinations of two parameters are calculated and are compared among different activity groups. There are, nearly always, such combinations of parameters that give very high correlation coefficients for the most active group, whereas those for other groups are significantly lower. This monopoly of high correlation by the most active group indicates that this is one of the required structural equilibria for the highest activity. When the structural parameters $x_i$ and $x_j$ are the case, an estimated equilibrium constant $a_{ij}$ is expressed by $a_{ij}=(x_j-b_{ij})/x_i$, wherein $b_{ij}$ is a correction factor. This equilibrium equation is derived from the regression line $x_j=a_{ij}x_i+b_{ij}$ which is obtained for the group of compounds with the desired property. The value $(x_j-b_{ij})/x_i$ of the most active group is nearly constant around the value $a_{ij}$, while the values of other groups vary widely.

The value $a_{ij}$ is the estimated equilibrium constant of two structural parameters $x_i$ and $x_j$, which reflects a certain equilibrium of elementary properties for the highest activity. This simple process gives a new light to the problem and, in fact, creates a new structural parameter. This process has not been tried.

(3) By using all parameters prepared in (1) and (2), the control charts are produced. This is nothing but plotting data either on paper or in the n-dimensional space by the aid of computer and determine from the plots the structural outer limit of the most active group. The discrimination power is the only criterion to compare among several control charts.

Thus, the construction and selection of the control charts are complete. But this process is repeated when a new addition of data becomes available or when better structural parameters are suggested.

BRIEF DESCRIPTION OF THE INVENTION

DETAILED DESCRIPTION OF THE EXAMPLES

Preferred examples of this invention will now be described with reference to the accompanying drawings.

EXAMPLE 1

Figure 1:
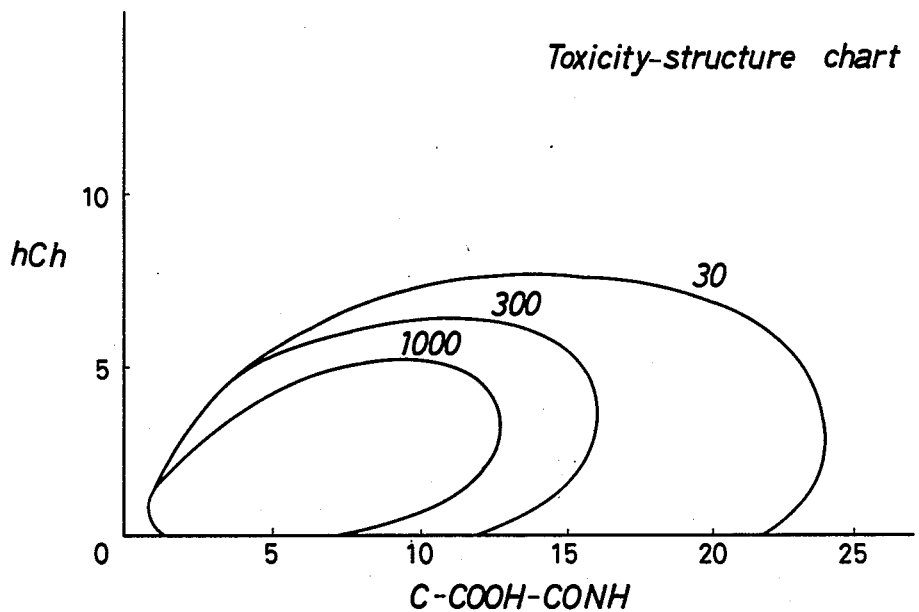
FIG. 1 is a control chart necessary for conducting the method for predicting properties of a chemical compound according to this invention.

Method for Predicting Acute Toxicity of Chemical Substances From Their Structural Formula Conventionally, the degree of toxicity of a compound has been known only after actual dose. $LD_{50}$ data for small animals (intravenous dose) contained in the Merck Index (9th edition) were thoroughly taken to use as a learning set, which amounts to more than 300 compounds. The control chart from these data is shown in FIG. 1. The predictability of this chart was tested with 82 other compounds. The scores of prediction are summarized in Table I.

In FIG. 1, the following definitions are employed:

$LD_{50}/M$:
Toxicity scale used for this study. Unit of ordinary $LD_{50}$ values are mg/kg, where mg is the quantity of substance dosed for 50% lethality and kg is the weight of the test animal.
To standardize this value on the millimore base, the $LD_{50}$ values is divided by the molecular weight. In FIG. 1, the quantity is further multiplied by 100 to avoid unfamiliarly small digits.

C—COOH—COHN:
The structural parameter along X-axis. This is an approximate measure ot lipophilicity, which is produced by subtracting the numbers of carboxylic acids and amides from the total number of carbon atoms.

hCh:
The structural parameter along Y-axis. This value is the sum of the numbers of such groups that has two-hereto-atoms on both sides of carbon atoms. They include COOH, CONH, COOR,

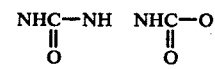

and so forth. This parameter would be related to the hydrophilicity of molecule. The hCh value is 1 for carboxylic group and 3 for urea group.

TABLE 1

| | Scores of Predictability of Toxicity | | |
|---|---|---|---|
| Control limit | $LD_{50}/M$ observed | No. of Compounds found in the limit (Total No.) | Note |
| 1000 | ≧1000 | 3/3 | 100% predicted |
| | ≧300 | 1/2 | 50% discriminated |
| | ≧30 | 8/29 | 72.5% discriminated |
| | ≧0 | 8/48 | 83.3% discriminated |
| 300 | ≧300 | 5/5 | 100% predicted |

TABLE 1-continued

| | | Scores of Predictability of Toxicity | |
|---|---|---|---|
| Control limit | $LD_{50}/M$ observed | No. of Compounds found in the limit (Total No.) | Note |
| | ≧30 | 12/27 | 55.6% discriminated |
| | ≧0 | 9/48 | 81.2% discriminated |

The following two cases are shown to illustrate the way to use FIG. 1.

Compound I

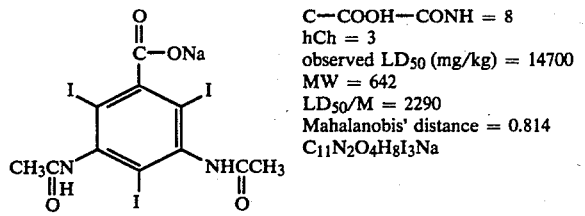

C—COOH—CONH = 8
hCh = 3
observed $LD_{50}$ (mg/kg) = 14700
MW = 642
$LD_{50}/M$ = 2290
Mahalanobis' distance = 0.814
$C_{11}N_2O_4H_8I_3Na$ Compound II

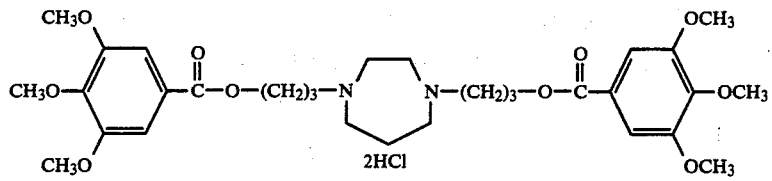

C—COOH—COHN = 31
hCh = 3
$LD_{50}$ (observed) = 26.6 mg/kg
MW = 677
$LD_{50}/M$ = 32.768
Mahalanobis' distance = 32.768
$C_{31}N_2O_{10}H_{44}.2HCl$ Compound I is located within the control limit 1000. Since Mahalanobis' generalized distance of the control limit 1000 is calculated to be 7.6702. This number alone can tell that it is found within the limit. In the similar way, Compound II is located in the high toxicity region. In order to design a less toxic homolog, this chart clearly show the direction of modification.

EXAMPLE 2

Method for Predicting Good-Taste Compounds From Other Taste-Active Compounds

Figure 2B:
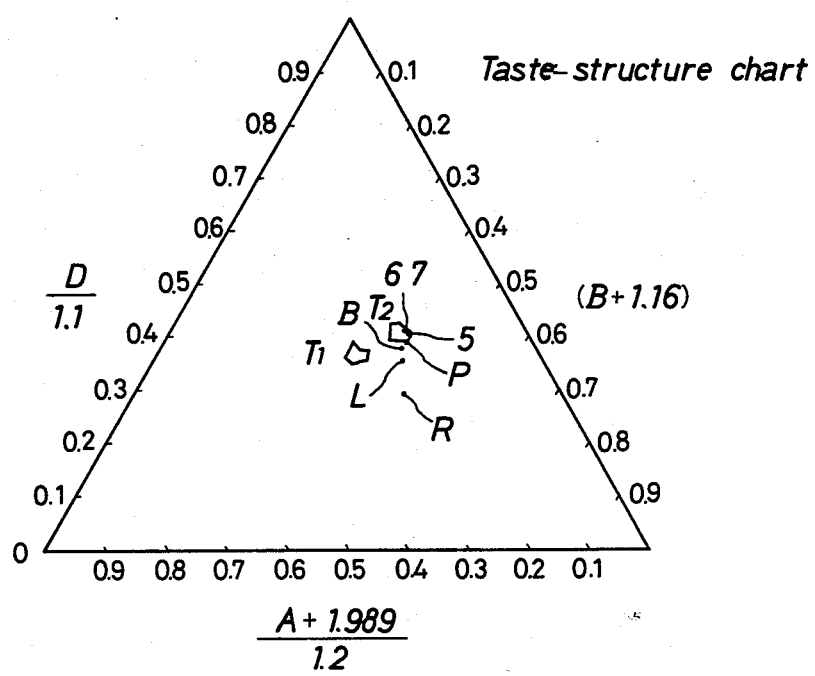
FIG. 2B is a triangular control chart according to the example of FIG. 2A.
Figure 2A:
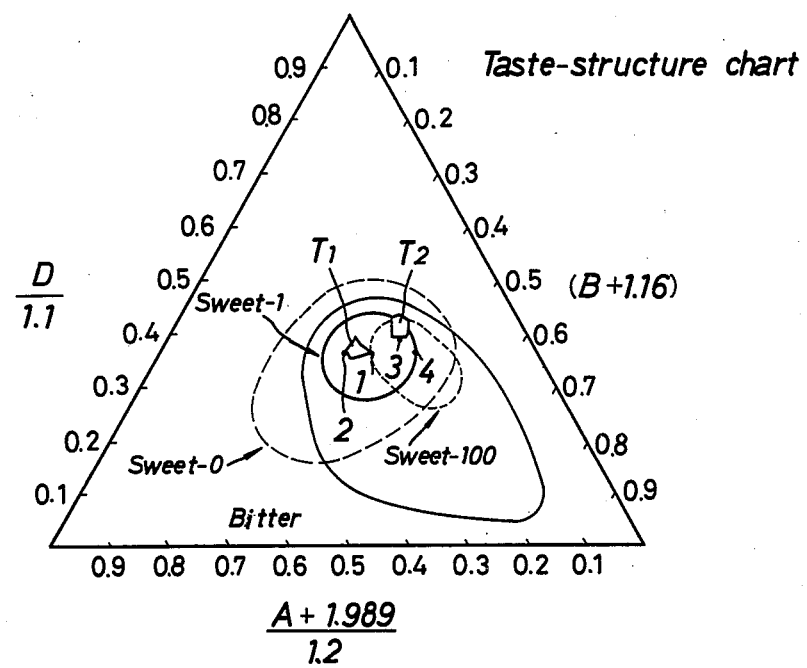
FIG. 2A is a triangular control chart according to another example of this invention.

Structure-taste relationships are still poorly known. A general control chart to define the structural requirements of taste-active compounds are shown in FIG. 2A. The sources of the data are those published in the last 10 years on the low-molecular weight tastants. The total number of compounds used for this analysis is 831.

Areas $T_1$ and $T_2$ are those of umami (good taste rather than sweet taste) compounds where all 37 known compounds are included without exception. The areas Sweet-100, -1, and -0 are those of respective sweetness levels (sweetness of sucrose=1). Sweet-100 consists of 98 compounds whose sweetness are more than 100. Sweet-1 group has 102 compounds with sweetness less than 100 but at least 1, including sucrose itself. Sweet-0 (157 compounds) are those reported to have sweetness less than 1. The trilateral chart is borrowed from the usual way to describe the three-component-system and, here, expresses the proportion of three structural parameters (A+1.989), B+1.16, and D, which are defined as follows:

A: The number of active protons (Example: COOH, OH, aromatic NH, active CH etc.)
B: The number of branches

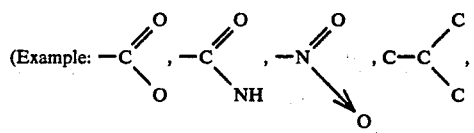

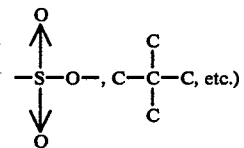

D: The number of electron-donors (Example: heteroatoms, halogen atoms, armatic c-ring, isolated C=C etc.)

The denominators appeared in D/1.1 or (A+1.989)/1.2 has no particular meaning except bringing area $T_1$ to the center of the chart. In this trilateral chart, the sum of three components is adjusted to become 1. Within $T_1$ and $T_2$, only two bitter-tasting compounds are found out of 437 compounds (discrimination power is 99.5%). While many known sweeteners are known to show bitter taste at the same time, sucrose (1), cyclamic acid (2) and aspartame (3) are known to be lacking bitter taste. These three ideal sweeteners are found very near to one of good taste zones, whereas saccharine (4), which is known to have a slight bitterness, is located a little apart from good taste zones.

To construct FIG. 2A, the principle of balance was applied. In Table 2, a part of the list of correlation coefficients is reproduced.

Here, high correlations are shown for umami compounds and highly sweet compounds, while the coefficients gradually decrease toward bitter group. The coefficient of A and D for umami group is rather low, but a close examination of data revealed that it consists of two clusters entirely apart, and the coefficients for each group turned out to be 0.995 and 0.900. These two clusters correspond to $T_1$ and $T_2$.

TABLE 2

| Examples of comparison of correlation coefficients | | | |
|---|---|---|---|
| | Parameter combinations | | |
| | B and D | A and D | C and D |
| Umami group | 0.981 | 0.679 | 0.932 |
| | | (0.995)* | |
| | | (0.900) | |
| Sweet-100 | 0.896 | 0.933 | 0.834 |
| Sweet-1 | 0.915 | 0.870 | 0.663 |
| Sweet-0 | 0.945 | 0.854 | 0.838 |
| Bitter | 0.805 | 0.800 | 0.678 |

*See the text.

Now that the umami compounds are taken as those of most favorably-balanced structures, the equilibrium constants of two structural parameters are determined by obtaining the regression lines for the group. When two structural equilibria are simultaneously required. (A and D, and B and D) with one parameter in common, one can reach such an expression of equilibrium as FIG. 2A to visibly show the balancing point of three parameters.

EXAMPLE 3

Method for Predicting the Structure of Sweet Tasting Dipeptides

FIG. 2A is the control chart covering all kinds of taste-active compounds. It is a general map, but naturally too crude for lead-optimization.

In this example, only dipeptides are dealt with. Although aspartame and some similar dipeptides are known to show strong sweetness, many of similar dipeptides are bitter. To discriminate sweet dipeptides (sweetness more than 100) from bitter ones, FIG. 3 was prepared.

Figure 3:
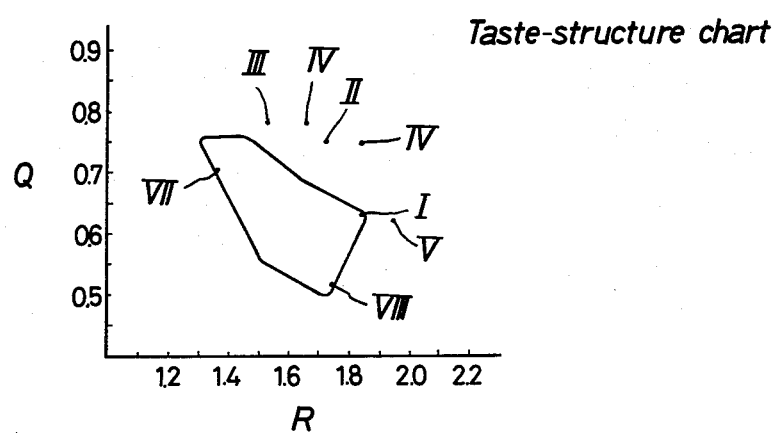
FIG. 3 is a control chart according to another example of this invention.

In FIG. 3, the structural limit for sweetness is circled.

$$Q = \frac{A + 1.989}{D}$$

$$R = \frac{C + 0.693}{D}$$

C: The number of carbon atoms
A and D were already defined elesewhere.

This 3-parameter-balance may be expressed with a trilateral chart, but X-Y coordinate is more general and easy to handle.

When aspartame (I) is modified to free acid (II), to glutamyl derivative (V, VI) or to other similar structures (III, IV), bitter taste is observed. On the other hand, VII, VIII are sweet peptides. They are well-discriminated with FIG. 3, therefore, it can be used for lead-optimization research.

(I) 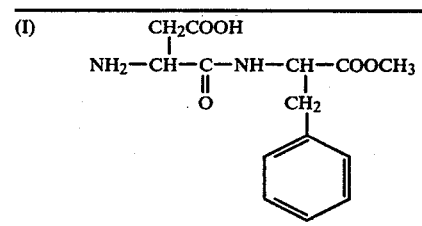

When the taste of sucrose is 1 (one), that of this compound is about 150 times sweeter than the former.

(II) 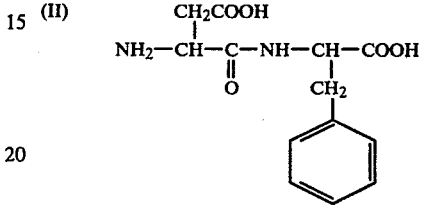

Bitter taste (III) 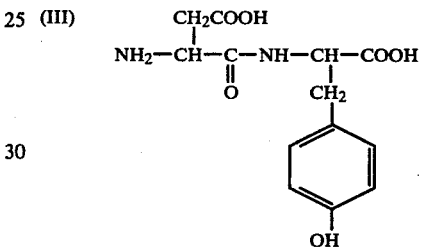

Bitter taste (IV) 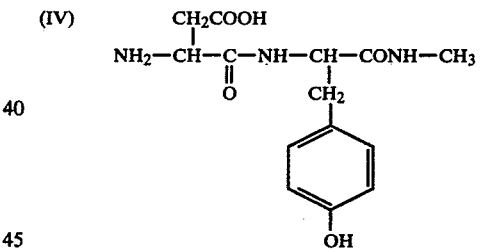

Bitter taste (V) 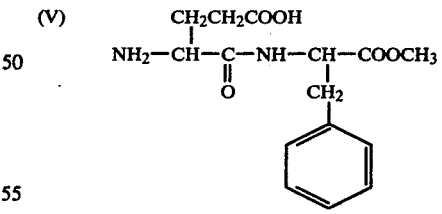

Bitter taste (VI) 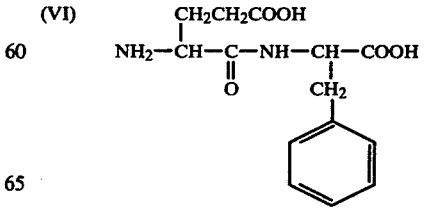

Bitter taste

-continued (VII) 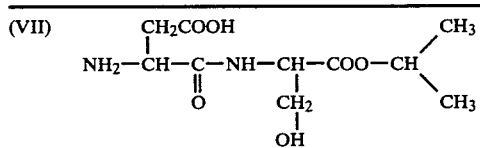

The sweet taste of this compound is about 120 times sweeter than sucrose.

(VIII) 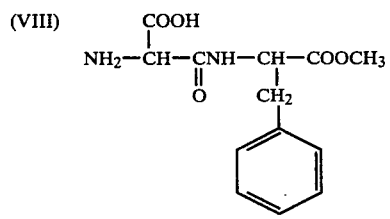

The sweet taste of this compound is about 200 times sweeter than sucrose.

I claim:

1. Method for predicting properties of a chemical compound wherein, on the basis of all available information about the chemical structure and observed activities, an optimal range of the chemical structure of a desired property is described with a control chart or the Mahalanobis' generalized distance, thereby the properties of the chemical compound being able to be predicted by analyzing only the chemical structure.

2. The method as claimed in claim 1, applying the principle of equilibrium thereto, in which a highly active compound has an equilibrium of structural features.

3. The method as claimed in claim 2, wherein an estimated equilibrium constant $a_{ij}$ of two structural parameters $x_i$ and $x_j$ is expressed by $a_{ij}=(x_j-b_{ij})/x_i$, said $b_{ij}$ being a correction factor, thereby an equilibrium equation being derived by the regression line $x_j=a_{ij}x_i+b_{ij}$ which is obtained for a group of compounds having a desired property.

4. The method as claimed in claim 1 or 3, wherein said control chart is a triangular one or a graph of two-dimensional X-Y chart.

* * * * *